(12) United States Patent
Puckett et al.

(10) Patent No.: US 11,215,760 B2
(45) Date of Patent: Jan. 4, 2022

(54) DEVICE FOR EMISSION OF ARBITRARY OPTICAL BEAM PROFILES FROM A CHIP TO FREE SPACE

(71) Applicant: Honeywell International Inc., Morris Plains, NJ (US)

(72) Inventors: Matthew Wade Puckett, Phoenix, AZ (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/800,877

(22) Filed: Feb. 25, 2020

(65) Prior Publication Data

US 2021/0263221 A1   Aug. 26, 2021

(51) Int. Cl.
*G02B 6/34* (2006.01)
(52) U.S. Cl.
CPC ..................... *G02B 6/34* (2013.01)
(58) Field of Classification Search
CPC ....... G02B 6/34; G02B 5/1861; G02B 5/1866
See application file for complete search history.

(56) References Cited

U.S. PATENT DOCUMENTS

| | | | |
|---|---|---|---|
| 8,111,955 B2* | 2/2012 | Kuwano | G02B 6/13 385/14 |
| 8,328,396 B2 | 12/2012 | Capasso et al. | |
| 9,354,362 B2 | 5/2016 | Li et al. | |
| 10,295,741 B2 | 5/2019 | Melikyan et al. | |
| 10,557,994 B1* | 2/2020 | Lee | G02B 6/34 |
| 2005/0254752 A1 | 11/2005 | Domash et al. | |

(Continued)

FOREIGN PATENT DOCUMENTS

| | | |
|---|---|---|
| CN | 104765086 B | 8/2018 |
| CN | 108776367 A | 11/2018 |

(Continued)

OTHER PUBLICATIONS

Puckett, Matthew W. et al., "Device for the Emission of Arbitrary Optical Beam Profiles From Waveguides Into Two-Dimensional Space", U.S. Appl. No. 16/803,712, filed Feb. 27, 2020, pp. 1-20, Published: US.

(Continued)

*Primary Examiner* — Charlie Y Peng
(74) *Attorney, Agent, or Firm* — Fogg & Powers LLC (57) ABSTRACT

An optical coupler device comprises a substrate having a substantially planar upper surface, and a grating structure on the upper surface of the substrate. In one embodiment, the grating structure comprises a copropagating array of waveguides that are substantially parallel to each other and extend along at least a portion of the upper surface of the substrate. Each of the waveguides has opposing sidewalls, wherein a width of each waveguide is defined by a distance between the opposing sidewalls. The opposing sidewalls each have a periodic structure that produces a sidewall modulation for each of the waveguides. An input port is in optical communication with the grating structure. The input port is configured to direct an input light beam in plane into the grating structure such that the beam propagates along the waveguides. The grating structure is configured to diffract the beam out of plane and into free space.

14 Claims, 12 Drawing Sheets

(56) References Cited

U.S. PATENT DOCUMENTS

| | | | |
|---|---|---|---|
| 2008/0193080 A1 | 8/2008 | Cheben et al. | |
| 2014/0010498 A1* | 1/2014 | Verslegers | G02B 6/30 385/37 |
| 2017/0138789 A1 | 5/2017 | Ivanov | |
| 2019/0243064 A1 | 8/2019 | Menezo et al. | |

FOREIGN PATENT DOCUMENTS

| | | | |
|---|---|---|---|
| CN | 106959482 B | 8/2019 | |
| CN | 106597588 B | 10/2019 | |
| EP | 2103974 A1 | 9/2009 | |
| EP | 2685298 A1 | 1/2014 | |
| WO | WO-0241036 A2 * | 5/2002 | G02F 1/3132 |
| WO | 2019207638 A1 | 10/2019 | |

OTHER PUBLICATIONS

Becker et al., "Out-of-Plane Focusing Grating Couplers for Silicon Photonics Integration With Optical MRAM Technology", IEEE Journal of Selected Topics in Quantum Electronics, 2019, pp. 1-8, vol. 26, No. 2, IEEE.

Chauhan et al., "Photonic Integrated Si3N4 Ultra-Large-Area Grating Waveguide MOT Interface for 3D Atomic Clock Laser Cooling", Conference on Lasers and Electro-Optics, 2019, pp. 1-2, OSA Publishing.

Kim et al., "Photonic waveguide to free-space Gaussian beam extreme mode converter", Light: Science & Applications 7:72, 2018, pp. 1-13, Official journal of the CIOMP 2047-7538, www.nature.com/lsa.

Vermeulen et al., "Reflectionless Grating Coupling for Silicon-on-Insulator Integrated Circuits", 8th IEEE International Conference of Group IV Photonics, Sep. 2011, pp. 1-3, IEEE.

Xu et al., "Complementary metal-oxide-semiconductor compatible high efficiency subwavelength grating couplers for silicon integrated photonics", Applied Physics Letters 101, 2012, pp. 1-5.

Yulaev et al., "Metasurface-Integrated Photonic Platform for Versatile Free-Space Beam Projection with Polarization Control", ASC Photonics, Sep. 18, 2019, pp. 1-8, American Chemical Society.

Zhu et al., "Ultra-compact silicon nitride grating coupler for microscopy systems", Dec. 25, 2017, pp. 1-8, vol. 25, No. 26, Optics Express.

European Patent Office, "Extended European Search Report from EP Application No. 20212582.9", from Foreign Counterpart to U.S. Appl. No. 16/800,877, dated Apr. 8, 2021, pp. 1 through 8, Published: EP.

\* cited by examiner

DEVICE FOR EMISSION OF ARBITRARY OPTICAL BEAM PROFILES FROM A CHIP TO FREE SPACE

STATEMENT REGARDING FEDERALLY SPONSORED RESEARCH OR DEVELOPMENT

This invention was made with Government support under HR0011-16-C-0122 awarded by DARPA. The Government has certain rights in the invention.

BACKGROUND

Integrated photonics has grown over the past several decades to be valuable to a wide range of applications. One of the more recent of these applications is in the generation of a magneto-optical trap, or MOT. A necessary component of a MOT is an array of three optical beams, travelling orthogonally to each other, which intersect in free space. Typically, complex sets of discrete optical components are required to generate the three optical beams, but it has been recently shown that a single integrated photonics chip can achieve the same task.

Grating couplers are structures that are essential to integrated photonics, as these couplers allow for light to be diffracted out of the plane of a photonics chip and into free space. However, in order to emit an optical field with a desired intensity distribution, it is necessary to make the grating stronger or weaker as a function of position. The typical way to achieve this is by way of a term known as the "duty cycle." Each period of a grating is composed of a high refractive index region and a low refractive index region, and in the absence of apodization, each of these regions occupies an equal percentage of each grating period, meaning the duty cycle is equal to 0.5. If this ratio is either increased or decreased, the grating strength will be reduced. However, this state-of-the-art approach cannot be used to drive the grating strength all the way to zero because of lithographic limitations, and this approach additionally generates higher-order diffraction events, which waste power by emitting light in incorrect directions.

To achieve the needed performance from a photonics chip, a method is needed that provides for the emission of optical beams with uniform intensity distributions.

SUMMARY

An optical coupler device comprises a substrate having a substantially planar upper surface, and a grating structure on the upper surface of the substrate. In one embodiment, the grating structure comprises a copropagating array of waveguides that are substantially parallel to each other and extend along at least a portion of the upper surface of the substrate. Each of the waveguides has opposing sidewalls, wherein a width of each waveguide is defined by a distance between the opposing sidewalls. The opposing sidewalls each have a periodic structure that produces a sidewall modulation for each of the waveguides. An input port is in optical communication with the grating structure. The input port is configured to direct an input light beam in plane into the grating structure such that the input light beam propagates along the array of waveguides. The grating structure is configured to diffract the input light beam out of plane and into free space.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Optical coupler devices for the emission of arbitrary optical beam profiles from a chip to free space are described herein. The optical coupler devices can be implemented as grating couplers for use on-chip. Such a grating coupler is particularly suited to allow a wide two-dimensional light wave to diffract out of the grating coupler with a predetermined spatial profile from the chip into free space.

A method for fabricating the grating couplers uses various techniques for apodization of the gratings in the grating couplers. The present approach provides for producing a grating coupler in which a grating strength may be spatially apodized, in order to emit beams with uniform or other desired intensity distributions. As used herein, the terms "apodization" or "apodized" refer to controllably decreasing the amount of optical power diffracted from the grating over a unit length of interaction between the input wave and the grating.

In one technique, a grating structure is formed that includes an array of copropagating waveguides. The waveguides are positioned substantially parallel to each other in the grating coupler, and each waveguide is individually modulated by periodically changing its width. The grating strength in this technique scales with the modulation amplitude of the individual waveguides, and can be taken to zero without generating higher-order diffraction peaks.

In another technique, a grating structure is formed to include an array of zig-zag grating lines. The zig-zag grating lines are positioned in the grating coupler to be substantially perpendicular to a propagation direction of a light beam injected into the grating coupler. The zig-zag grating lines are configured to smoothly drive the grating strength down to zero as a zig-zag amplitude is increased.

In a process of fabricating a grating coupler according to the present approach, a substrate layer such as a wafer is provided, which is composed of a lower refractive index cladding material, and a guiding layer composed of a higher refractive index material is deposited on the substrate layer. A grating structure and an input slab are defined in the guiding layer through standard lithographic techniques. The gratings may be written into the slab, into which the grating are coupled, either (1) during a first lithographic step, which etches entirely into the higher refractive index material, or (2) during an optional second lithographic step, which etches partially into the higher refractive index material. The gratings are formed as an array of grating lines, wherein each of the grating lines has a periodic structure along a length thereof with a substantially uniform periodic amplitude. An upper cladding layer may optionally be deposited following these lithographic steps.

The grating strength can be apodized following either of these techniques, such that an optical beam with a predetermined intensity distribution will be generated when light is incident upon the grating structure. To operate the grating coupler, a light beam is injected into the input slab and allowed to propagate into the grating structure, which diffracts the light beam into free space with the desired intensity distribution.

The present grating couplers are particularly suited for use in an integrated photonics chip such as a silicon photonics chip, which is used in the generation of free space beams for a magneto-optic trap (MOT). Such a chip is designed to emit light beams at designed angles into free space, such as three expanded beams that intersect with each other in free space for use in a MOT. The grating couplers can be used to diffract light out-of-plane from the chip to produce expanded beams that intersect with each other in free space.

Further details of various embodiments are described hereafter with reference to the drawings.

Figure 1:
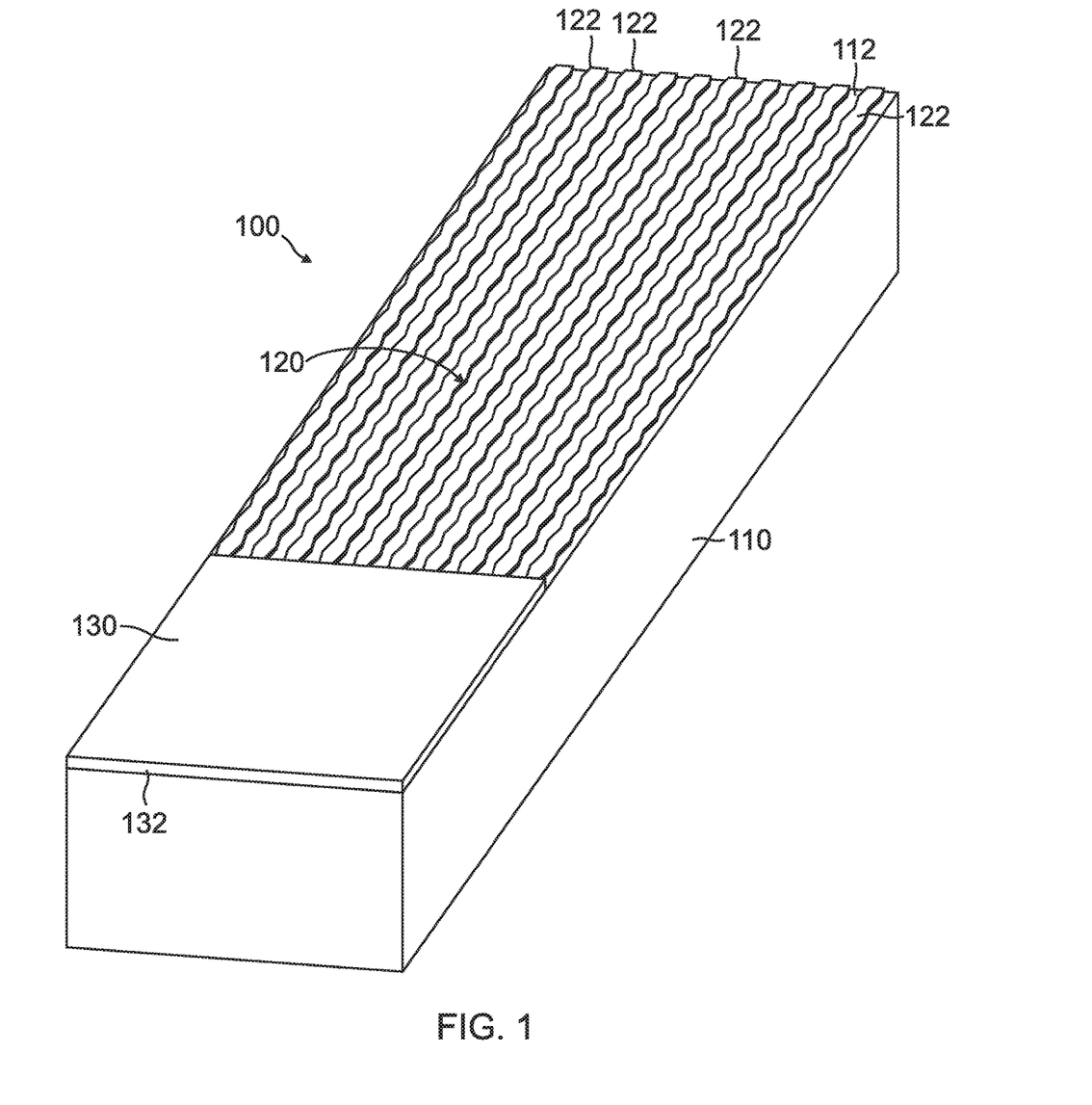
FIG. 1 is a schematic orthogonal view of a grating coupler, according to one embodiment.

In one approach for apodizing a grating, an embodiment of a grating structure is formed to include a copropagating array of waveguides. FIG. 1 is a schematic illustration of an optical coupler device comprising a grating coupler 100, according to one such embodiment.

The grating coupler 100 comprises a substrate 110 having a substantially planar upper surface 112, and a grating structure 120 on upper surface 112 of substrate 110. The grating structure 120 includes a copropagating array of waveguides 122 that are substantially parallel to each other and extend along at least a portion of upper surface 112. The array of waveguides 122 are positioned on upper surface 112 of substrate 110 to extend substantially parallel to, or in the same direction as, a propagation direction of a light beam that is input into grating structure 120.

As discussed in further detail hereafter, each waveguide 122 has a periodic change in width along a length of the waveguide, based on waveguide sidewall modulations, so that each waveguide is individually modulated by the periodic change in width. The grating structure 120 is configured to diffract an input light beam out of plane and into free space.

In one embodiment, an optical input slab 130 can be formed on upper surface 112 of substrate 110. The slab 130 is in optical communication with grating structure 120. The slab 130 provides an input port 132 that is configured to direct a light beam into grating structure 120, such that the light beam propagates along the array of waveguides 122. In one embodiment, slab 130 can be configured to be a waveguide beam expander.

The substrate 110 can be a cladding layer and is composed of a lower refractive index material, such as silicon dioxide ($SiO_2$), aluminum oxide ($Al_2O_3$), magnesium oxide (MgO), or potassium chloride (KCl). The substrate layer 110 can be part of an integrated photonics chip, such as a silicon photonics chip.

The grating structure 120 and slab 130 are composed of a higher refractive index material, such as silicon nitride ($Si_3N_4$), silicon (Si), titanium dioxide ($TiO_2$), gallium arsenide (GaAs), or gallium nitride (GaN).

In the embodiment of FIG. 1, grating coupler 100 is configured to emit the diffracted light beam out of plane and into free space along the surface normal of a chip upon which the grating coupler is fabricated. Alternatively, the grating coupler can be designed to emit the diffracted light beam in a controllable direction at varying angles into free space by changing the period of the grating. Longer periods will result in smaller changes in the direction of propagation between the incident light and the diffracted light.

Figures 2A, 2B:
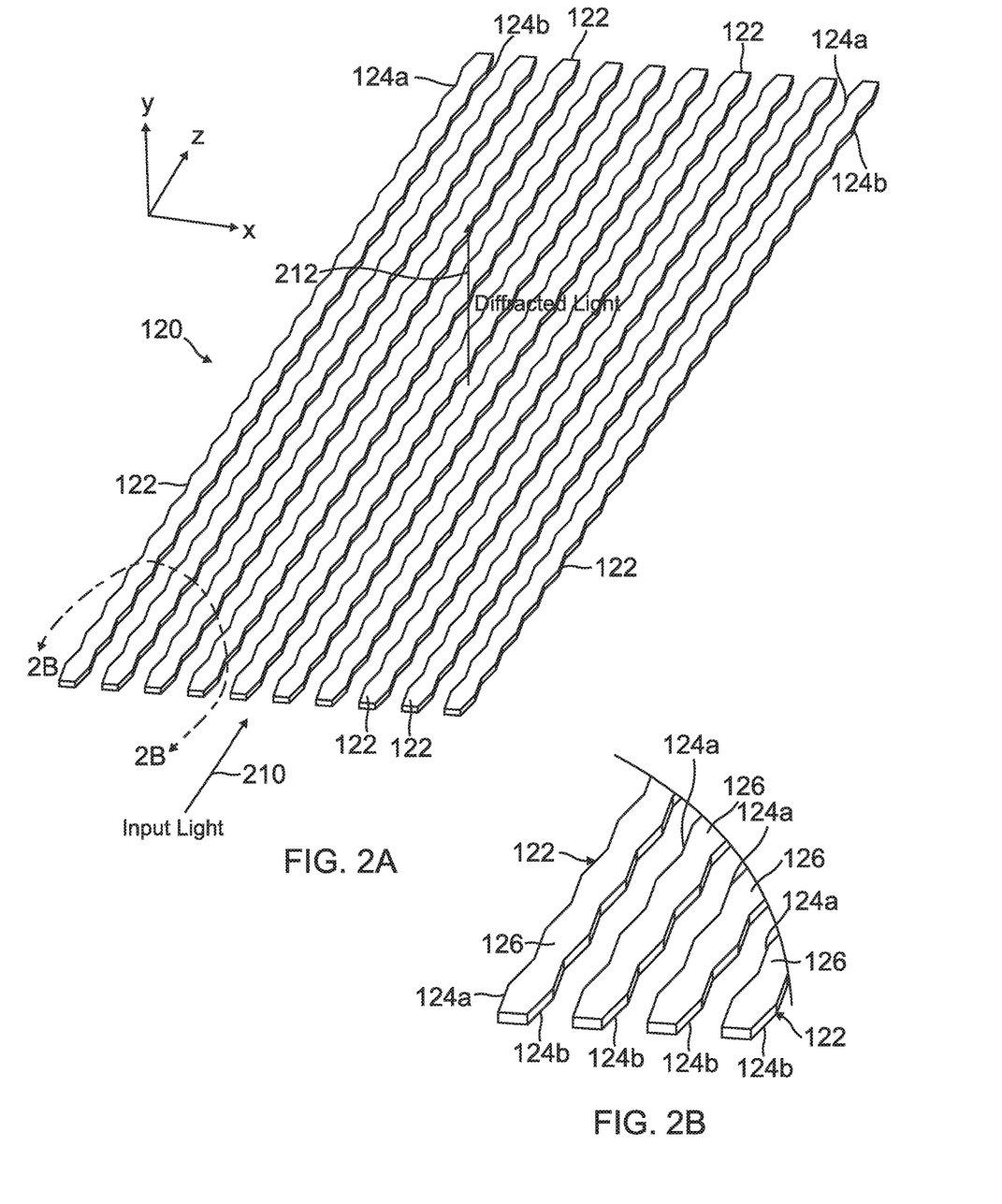
FIG. 2A is a schematic orthogonal view of the grating structure on the grating coupler of FIG. 1.
FIG. 2B is an enlarged orthogonal view of a portion of the grating structure of FIG. 2A.

FIGS. 2A and 2B are schematic illustrations, which show further details of grating structure 120. The copropagating waveguides 122 of grating structure 120 are closely spaced to each other, such as to have a distance of about 0.3 microns to about 0.7 microns between each waveguide.

As shown in FIG. 2B, each waveguide 122 has opposing sidewalls 124a, 124b and a top wall 126 between the sidewalls. A width of each waveguide 122 is defined by a distance between opposing sidewalls 124a, 124b. The width of each waveguide 122 is varied periodically such that a width of top wall 126 is also varied periodically. As such, opposing sidewalls 124a, 124b each have a periodic structure that produces a sidewall modulation for each waveguide 122. Thus, each waveguide 122 has a periodic change in width along a propagation direction based on the periodic structure of their opposing sidewalls, such that each waveguide is individually modulated by the periodic change in the width.

As shown in FIGS. 2A and 2B, each of waveguides 122 uniformly narrows and widens along the length of the waveguide, which produces the sidewall modulation. The sidewall modulation of each waveguide 122 leads to periodic perturbations of an input light beam 210, such as a wave that is confined along the vertical axis and collimated along the horizontal axis, propagating through grating structure 120, which in turn leads to a diffracted light beam 212 that is directed out of grating structure 120 into free space (FIG. 2A).

The angle of diffraction can be determined by the spatial period of the sidewall modulation, which is the physical length over which the waveguide is narrowed, widened, and narrowed again. The spatial period of the sidewall modulation can have a length of about 0.3 microns to about 2 microns, for example.

As further shown in FIG. 2A, an x-y-z coordinate system can be defined for grating structure 120. For an individual waveguide 122 in grating structure 120, a position of a left sidewall 124a can be defined by expression (1) as:

$$x_{left\ sidewall} = x_0 - (w/2 + a\sin(2\pi z/\lambda)) \quad (1)$$

where $x_0$ is the center of the waveguide, w is the unmodulated waveguide width, a is the sidewall modulation amplitude, and λ is the grating period. Also, a position of a right sidewall 124b of the waveguide can be defined by expression (2) as:

$$x_{right\ sidewall} = x_0 + (w/2 + a\ \sin(2\pi z/\lambda + \theta)) \quad (2)$$

where the additional variable, theta (θ), defines a phase shift between the modulation of the two sidewalls. When theta is equal to zero, the two modulations of the sidewalls are defined as being in-phase. In this case, the light scattered from left sidewall 124a is in-phase with the light scattered from right sidewall 124b. This results in complete constructive interference and a maximum value of the grating strength. In other alternative embodiments described hereafter, when theta is equal to pi, the two modulations of the sidewalls are defined as being out-of-phase. In such cases, the light scattered from the left sidewall is out-of-phase with the light scattered from the right sidewall. This results in complete destructive interference and a zero value of the grating strength.

A grating strength of grating structure 120 is a function of an amplitude of the sidewall modulations for each waveguide 122. The sidewall modulation amplitude is defined as one fourth of the total change in width of the waveguide within a single period of the grating. As an example, consider a waveguide with a mean width of 500 nm. The right sidewall has a modulation amplitude of 10 nm, meaning it has a peak-to-peak modulation of 20 nm. The waveguide width then has a maximum value of 520 nm and a minimum width of 480 nm, with the difference between these values being 40 nm. One fourth of this value is 10 nm, which is again what is defined as the modulation amplitude.

Figure 3:
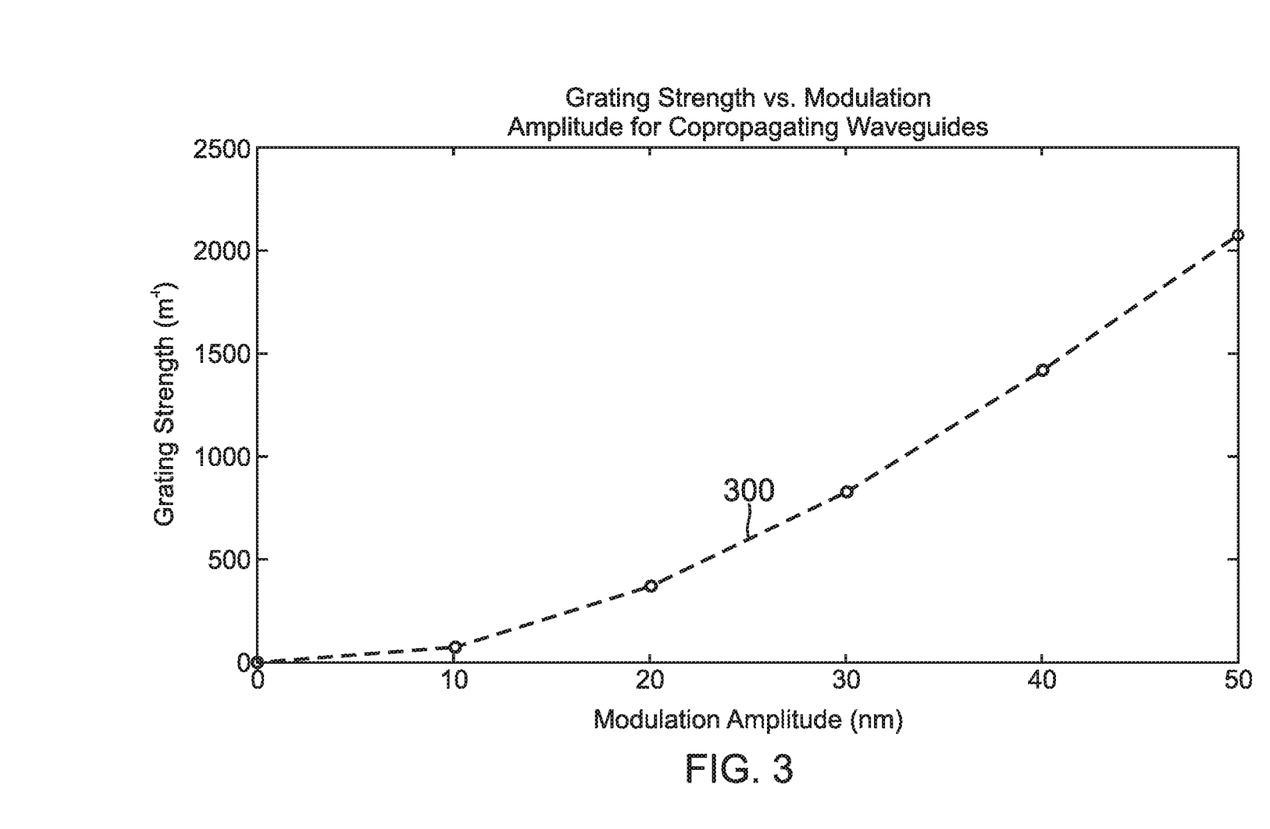
FIG. 3 is a graph of the grating strength with respect to modulation amplitude for copropagating waveguides of the grating structure of FIG. 2A.

FIG. 3 is a graph of the grating strength with respect to modulation amplitude for the copropagating waveguides of the grating structure of FIG. 2A. As shown in the graph of FIG. 3, the grating strength can be controlled by changing the modulation amplitude of the sidewall modulation. Thus, a smaller modulation amplitude for the sidewall modulation of each waveguide produces a weaker grating. As the modulation amplitude is increased, such as from about 10-50 nm, a corresponding increase in grating strength is produced as indicated by plot line 300.

The change in grating strength through the sidewall modulation amplitude can be used to produce a uniform diffracted beam that is output from the grating into free space. In one example, a square beam can be produced that has with uniform amplitude (e.g., 4×4 mm).

Figures 4A, 4B, 4C:
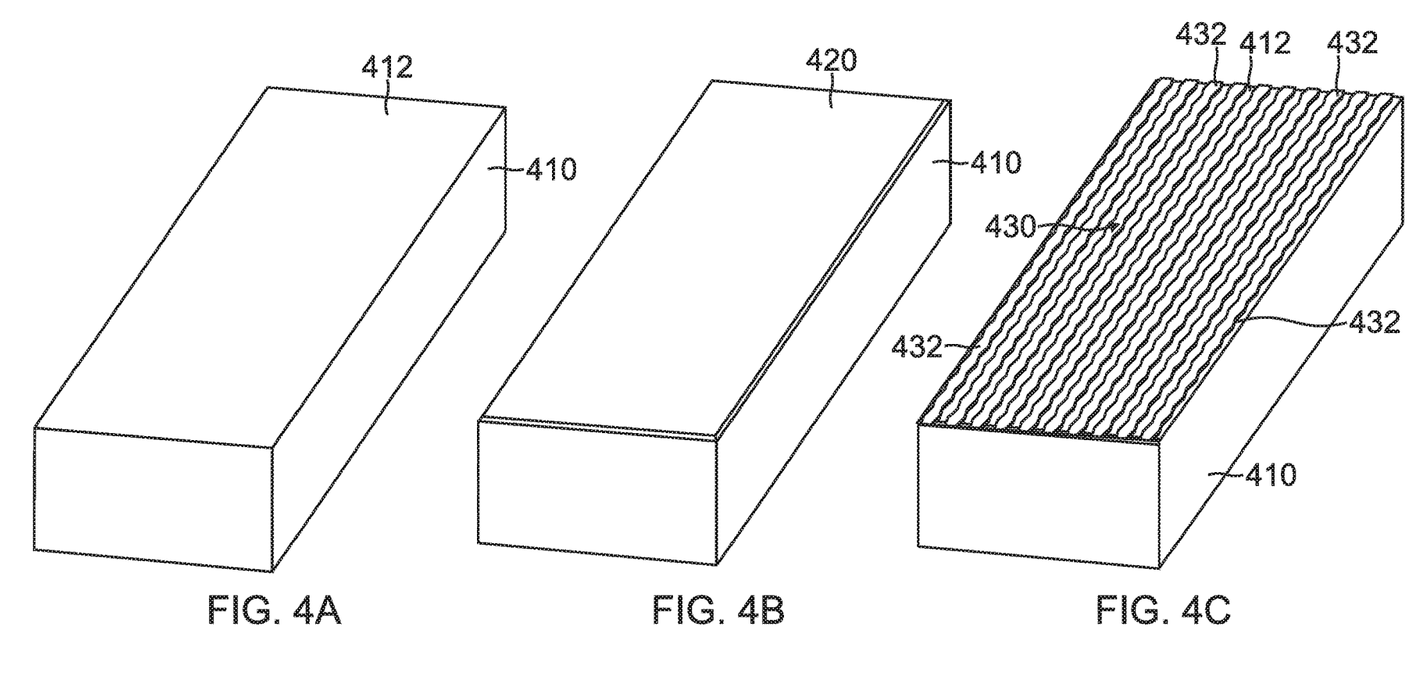
FIGS. 4A-4C illustrate schematic orthogonal views of a method for fabricating the grating coupler of FIG. 1.

FIGS. 4A-4C illustrate schematic orthogonal views of a method for fabricating a grating coupler, such as the grating coupler of FIG. 1, according to one approach. As shown in FIG. 4A, a substrate layer 410 such as an initial wafer is provided, and has an upper surface 412. The substrate layer 410 includes a first material having a first refractive index, such as silicon dioxide, and can include an underlying handle wafer such as a silicon handle.

As depicted in FIG. 4B, a waveguide layer 420 is deposited on upper surface 412 of substrate layer 410 such as by a conventional deposition process. The waveguide layer 420 includes a second material having a second refractive index (such as silicon nitride) that is higher than the first refractive index.

Lithography and etching steps are then performed on waveguide layer 420 to form a grating structure 430 that is defined by an array of copropagating waveguides 432, as shown in FIG. 4C. The copropagating waveguides 432 have periodic waveguide sidewall modulations, such as described previously.

Optionally an upper cladding layer can be formed over grating structure 430, such as by a conventional deposition process, to complete fabrication of the grating coupler. The upper cladding layer can include the first material having the first refractive index, such as silicon dioxide.

Additionally, an optical slab can be formed on upper surface 412 of substrate 410, such that the optical slab is in optical communication with grating structure 420. The optical slab can include the second material having the second refractive index, such as silicon nitride. The optical slab provides an input port that is configured to direct an input light beam into grating structure 420 during operation.

In other alternative approaches, changing the phase between the modulation of the opposing sidewalls allows for alternative methods for apodizing the copropagating waveguide grating coupler. Specifically, a phase offset can be introduced between the modulations of the opposing sidewall of each waveguide. If a default grating is defined as having a phase offset of 0 radians, then increasing the phase offset to pi (π) will drive the grating strength down to zero.

Figure 5A:
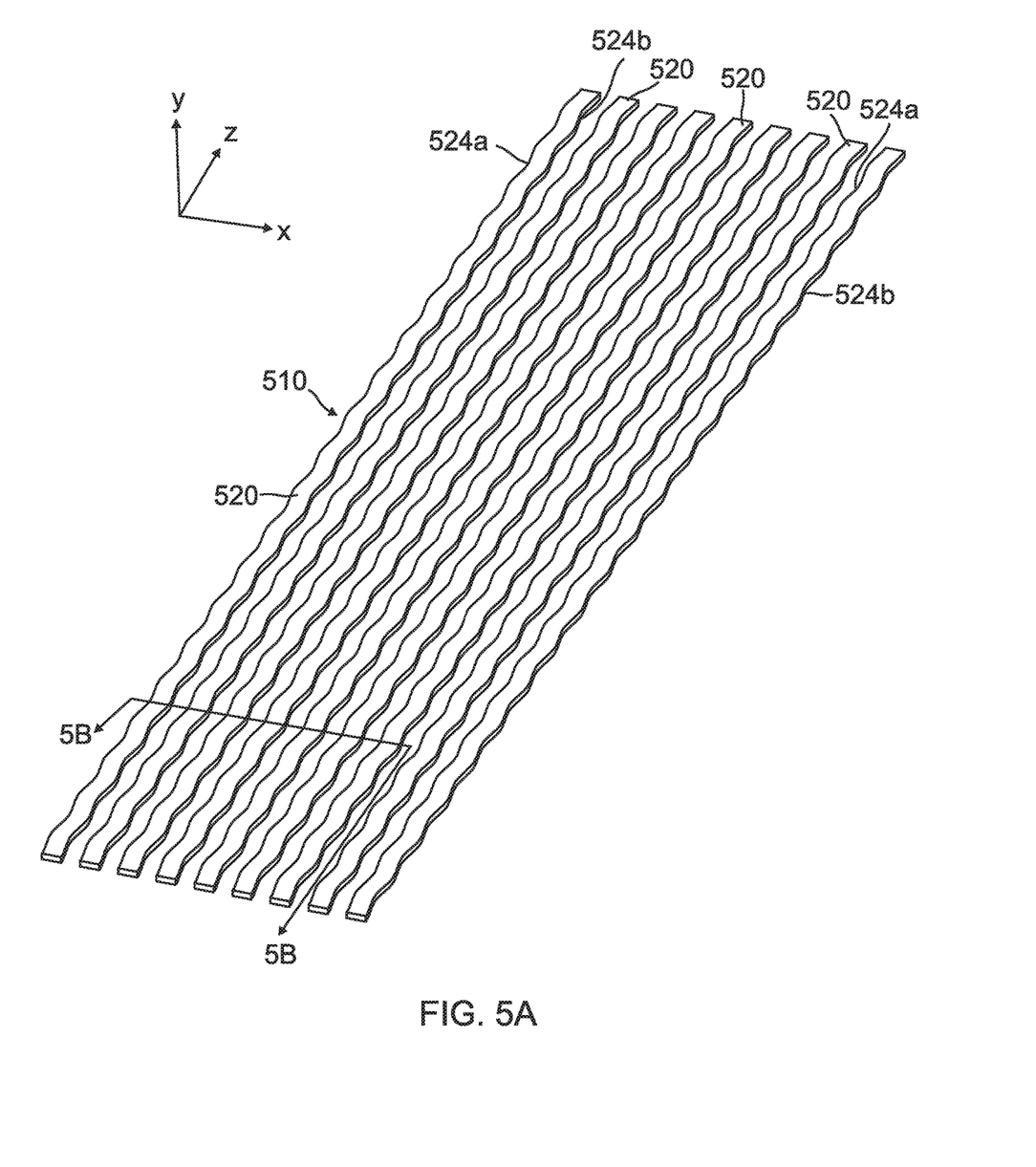
FIG. 5A is a schematic orthogonal view of a grating structure for a grating coupler, according to an alternative embodiment.
Figure 5B:
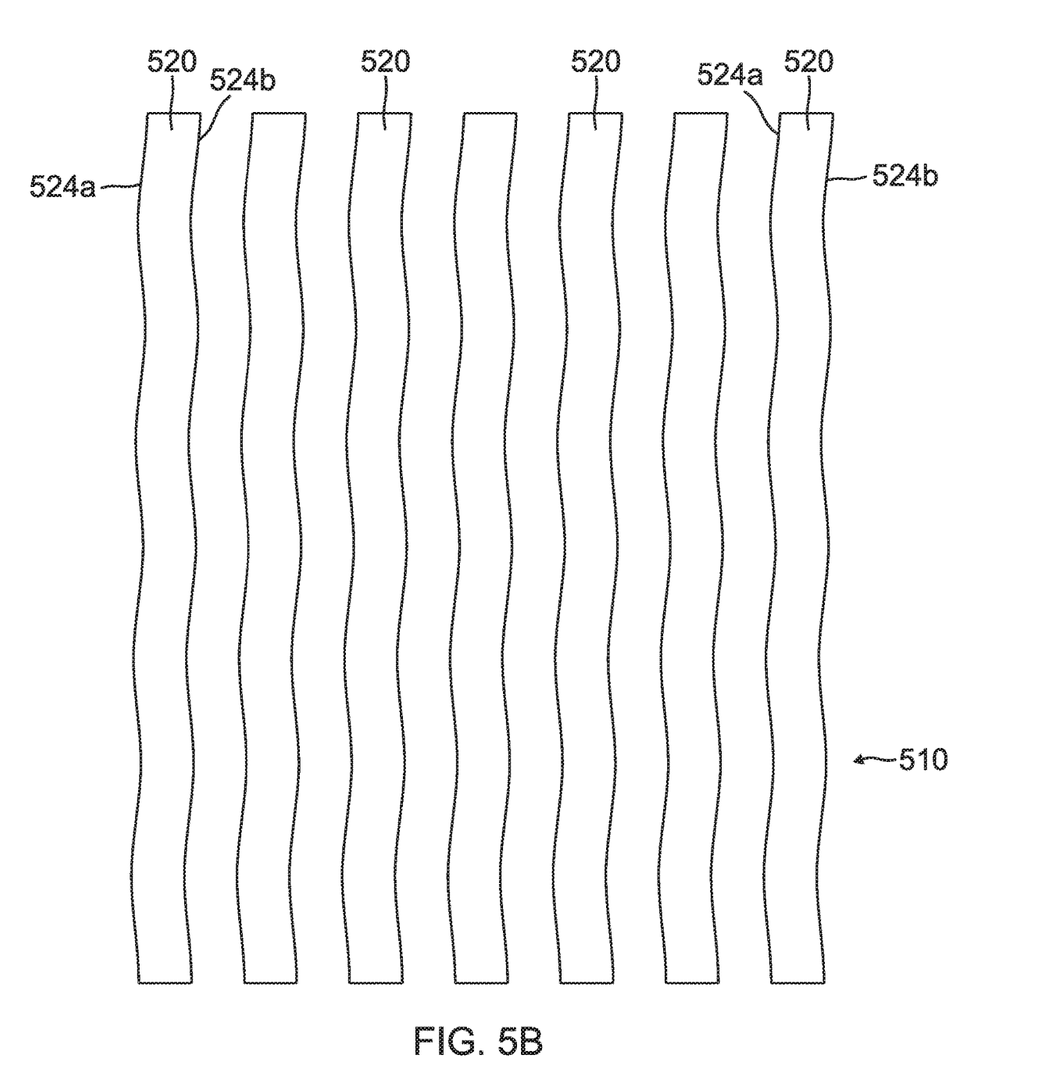
FIG. 5B is an enlarged top view of a portion of the grating structure of FIG. 5A.

For example, in alternative embodiments of a copropagating waveguide grating coupler, each waveguide of the grating structure can have opposing sidewalls with a serpentine shape along a propagation direction, based on the periodic structure of the sidewalls. FIGS. 5A and 5B are schematic illustrations, which show a grating structure 510 for use in a copropagating waveguide grating coupler, according to one such alternative embodiment.

The grating structure 510 includes a copropagating array of waveguides 520 that are substantially parallel to each other and are configured to extend along an upper surface of a substrate. The array of waveguides 520 are positioned to extend substantially parallel to, or in the same direction as, a propagation direction of a light beam that is input into grating structure 510. The grating structure 510 is configured to diffract an input light beam out of plane and into free space.

The waveguides 520 each have a serpentine shape, in which the width of each waveguide between their opposing left and right sidewalls 524a, 524b remains constant along the periodic serpentine shape of the waveguide. The serpentine shape is formed such that the opposing sidewalls of each waveguide have modulations that are 180 degrees out of phase. This results in a grating strength for grating structure 510 that can be reduced to zero.

As further shown in FIG. 5A, an x-y-z coordinate system can be defined for grating structure 510. For an individual waveguide 520 in grating structure 510, a position of a left sidewall 524a can be defined by expression (1) as set forth above. Also, a position of a right sidewall 524b of the waveguide can be defined by expression (2) as set forth above. In this embodiment, when theta is equal to pi, the two modulations of the sidewalls are defined as being out-of-phase. In this case, the light scattered from left sidewall 524a is out-of-phase with the light scattered from right sidewall 524b. This results in complete destructive interference and a zero value of the grating strength.

Figure 6A:
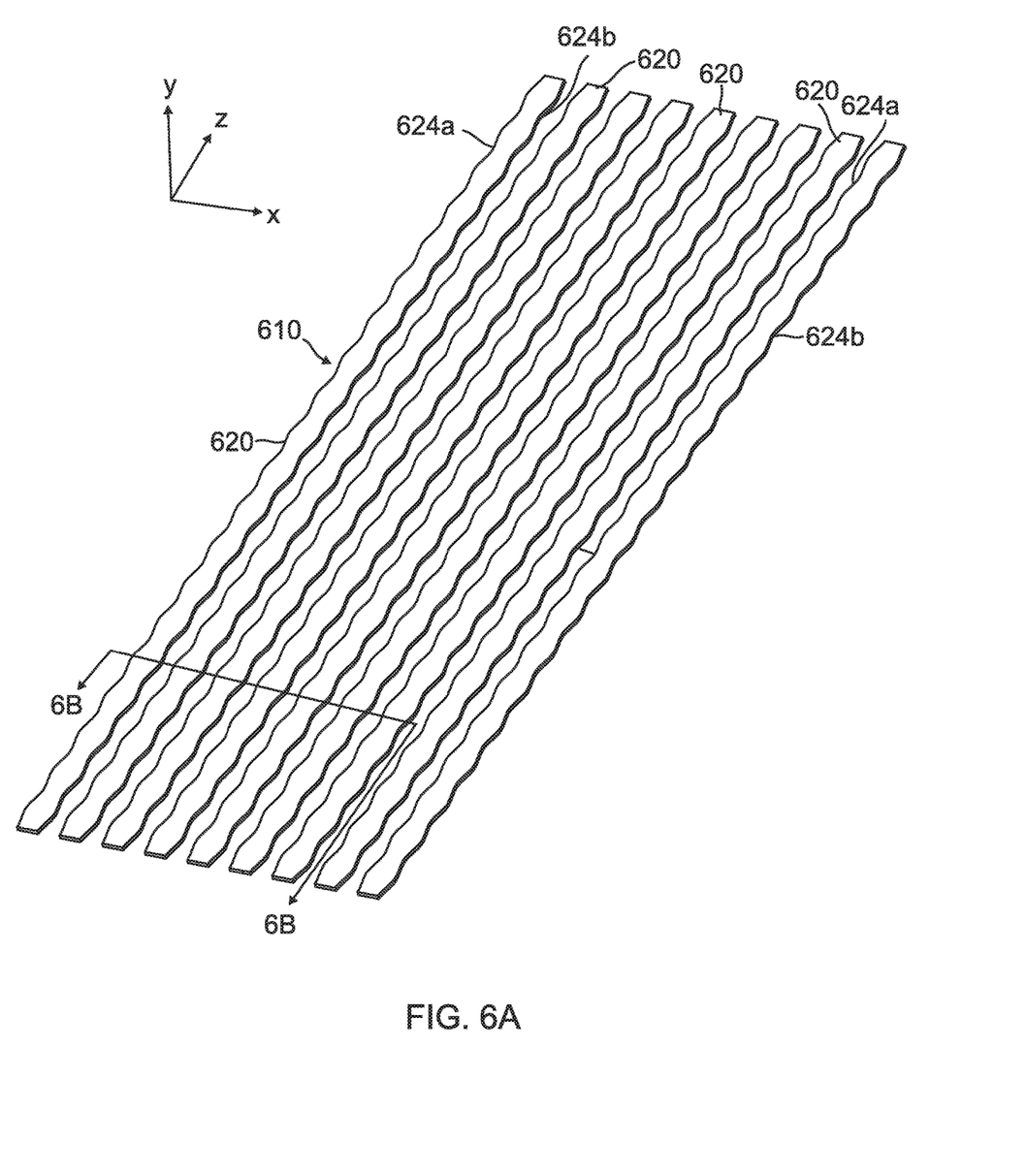
FIG. 6A is a schematic orthogonal view of a grating structure for a grating coupler, according to another alternative embodiment.
Figure 6B:
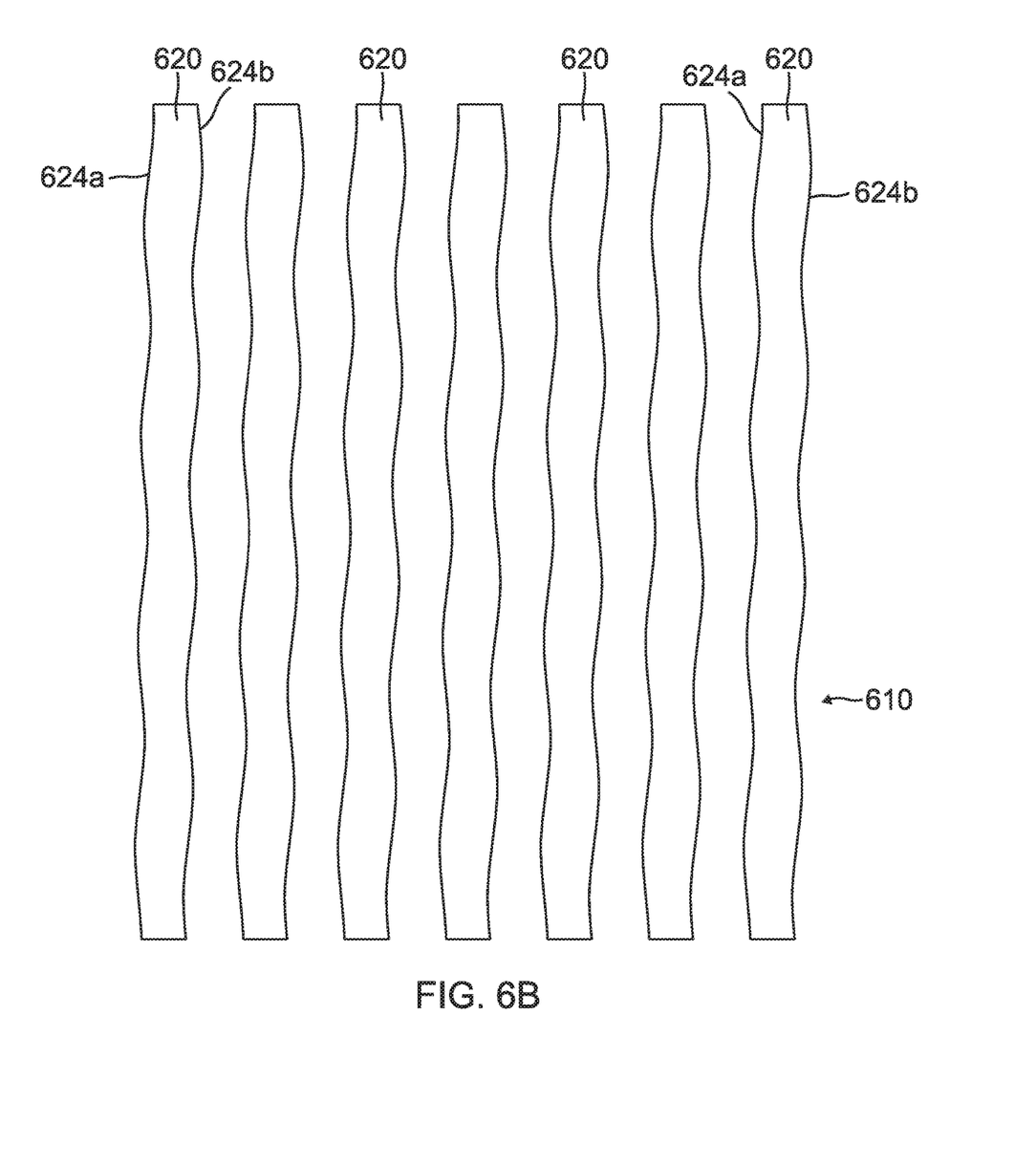
FIG. 6B is an enlarged top view of a portion of the grating structure of FIG. 5A.

In other alternative embodiments of a copropagating waveguide grating coupler, each waveguide of the grating structure can have opposing sidewalls with a semi-serpentine shape along a propagation direction, based on the periodic structure of the sidewalls. FIGS. 6A and 6B are schematic illustrations, which show a grating structure 610 for use in a copropagating waveguide grating coupler, according to another such alternative embodiment.

The grating structure 610 includes a copropagating array of waveguides 620 that are substantially parallel to each other and are configured to extend along an upper surface of a substrate. The array of waveguides 620 are positioned to extend substantially parallel to, or in the same direction as, a propagation direction of a light beam that is input into grating structure 610. The grating structure 610 is configured to diffract an input light beam out of plane and into free space.

The waveguides 620 each have a semi-serpentine shape such that opposing left and right sidewalls 624a, 624b of each waveguide are out of phase with respect to each other. For example, the semi-serpentine shape of waveguides 620 is such that the opposing sidewalls of each waveguide can have modulations that are about 90 degrees out of phase. This results in a grating strength for grating structure 610 that can be reduced, but is greater than zero.

As further shown in FIG. 6A, an x-y-z coordinate system can be defined for grating structure 610. For an individual waveguide 620 in grating structure 610, a position of a left sidewall 624a can be defined by expression (1) as set forth above. Also, a position of a right sidewall 624b of the waveguide can be defined by expression (2) as set forth above. In this embodiment, when theta is equal to 90 degrees, the two modulations of the sidewalls are again defined as being out-of-phase. In this case, the light scattered from left sidewall 624a is out-of-phase with the light scattered from right sidewall 624b. While there is some destructive interference such that the grating strength of grating structure 610 is reduced, the grating strength is still greater than zero.

Figure 7:
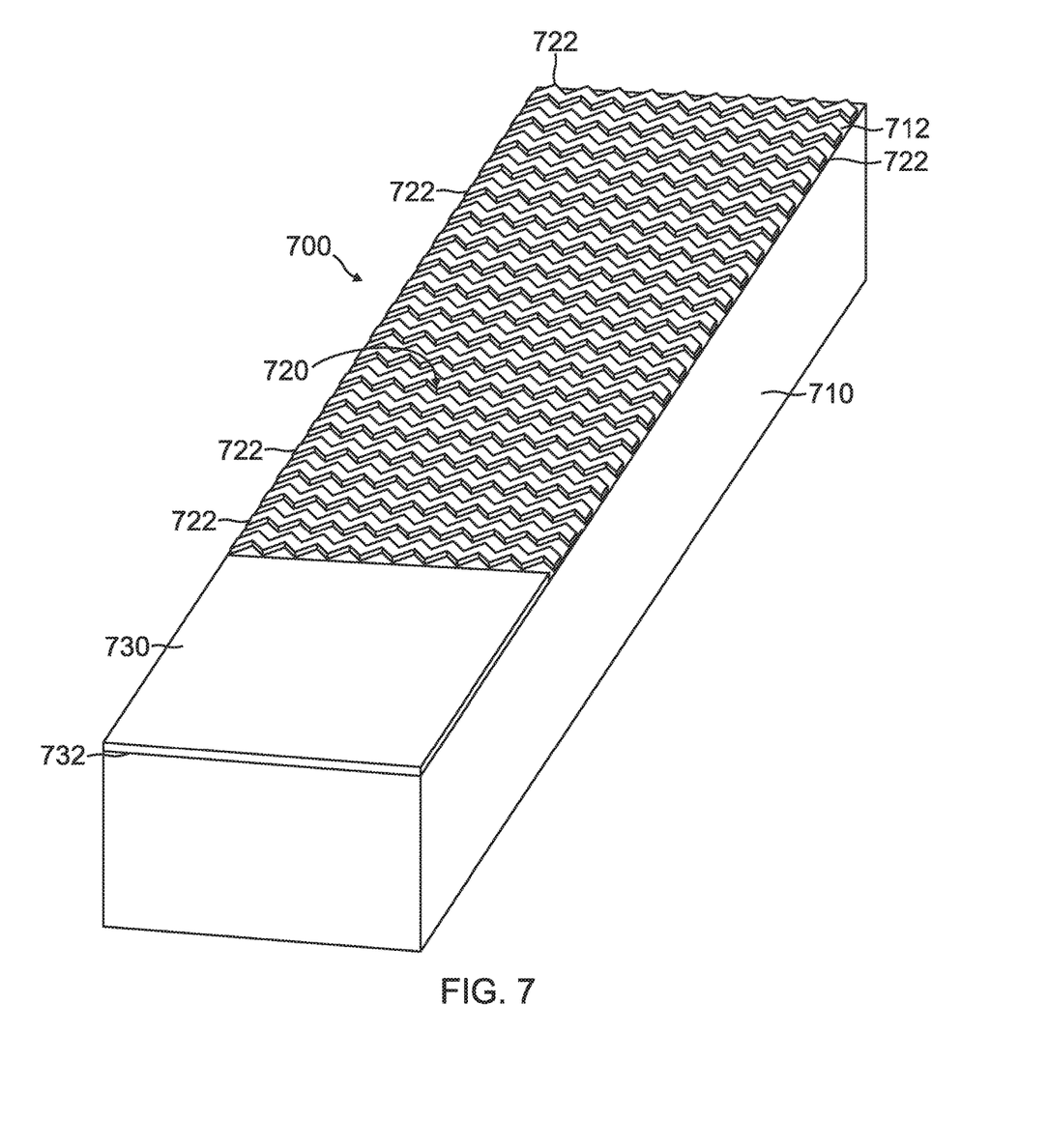
FIG. 7 is a schematic orthogonal view of a grating coupler, according to another embodiment.

In another approach for apodizing a grating, an embodiment of a grating structure is formed to include an array of zig-zag grating lines. FIG. 7 is a schematic illustration of a grating coupler 700, according to this embodiment.

The grating coupler 700 comprises a substrate 710 having a substantially planar upper surface 712, and a grating structure 720 on upper surface 712. The grating structure 720 includes an array of zig-zag grating lines 722. Each of zig-zag grating lines 722 are positioned on upper surface 712 to be substantially perpendicular to a propagation direction of a light beam that is input into grating structure 720.

An optical slab 730 can be formed on upper surface 712 of substrate 710. The optical slab 730 is in optical communication with grating structure 720. The optical slab 730 provides an input port 732 that is configured to direct a light beam into grating structure 720.

The substrate 710 can be a cladding layer and is composed of a lower refractive index material, such as silicon dioxide. The grating structure 720 and optical slab 730 are composed of a higher refractive index material, such as silicon nitride.

In the embodiment of FIG. 7, grating coupler 700 is configured to emit the diffracted light beam out of plane and into free space along the surface normal of a chip upon which the grating coupler is fabricated. Alternatively, the grating coupler can be designed to emit the diffracted light beam in a controllable direction at varying angles into free space by changing the period of the grating spatially.

Figure 8A:
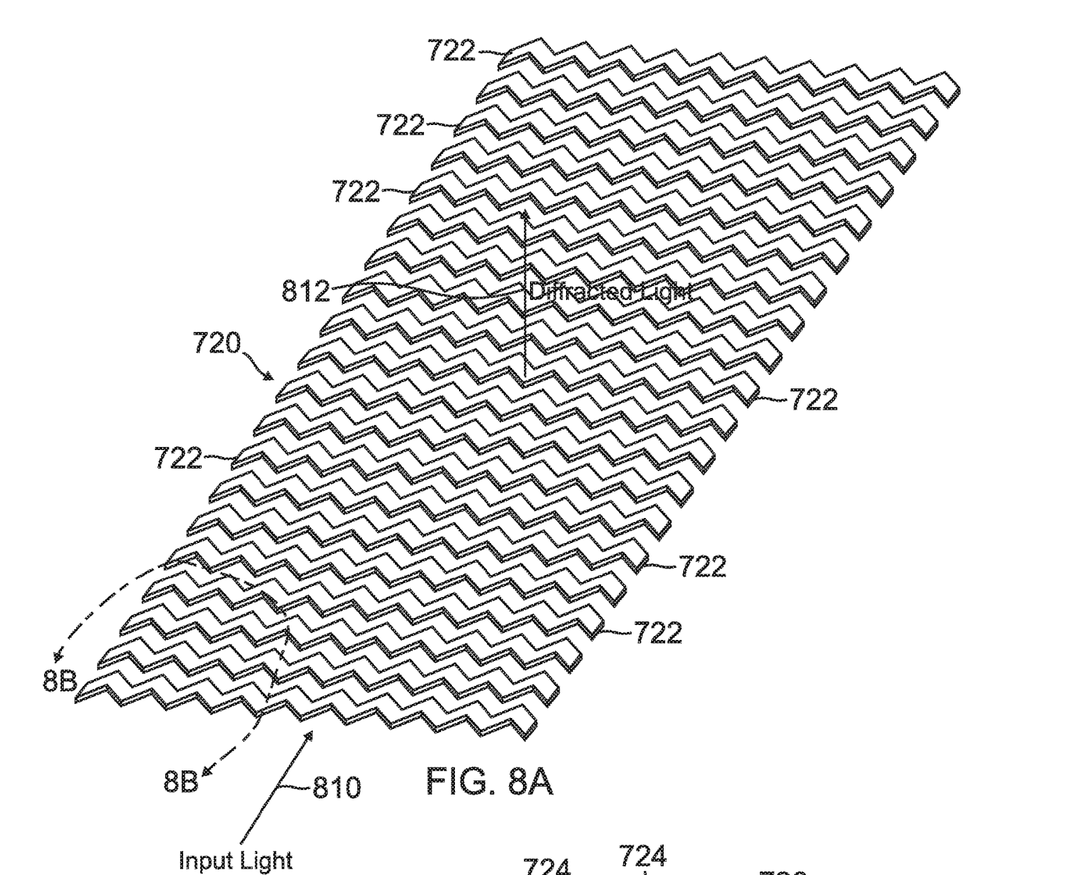
FIG. 8A is a schematic orthogonal view of the grating structure on the grating coupler of FIG. 7.
Figure 8B:
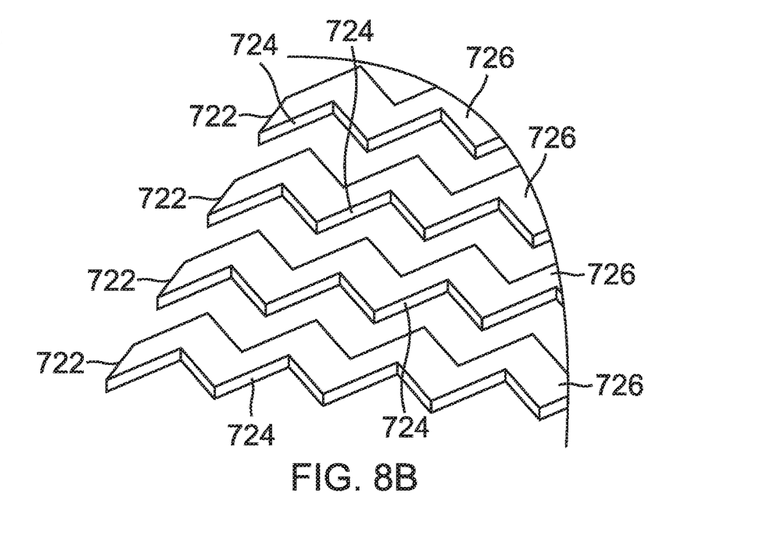
FIG. 8B is an enlarged orthogonal view of a portion of the grating structure of FIG. 8A.

FIGS. 8A and 8B are schematic illustrations, which show further details of grating structure 720. The array of zig-zag grating lines 722 of grating structure 720 are closely spaced to each other, such as to have a distance of about 0.3 microns to about 0.5 microns between each zig-zag grating line. As shown in FIG. 8B, each zig-zag grating line 722 has opposing sidewalls 724 and a top wall 726 between sidewalls 724.

The spacing between grating lines 722 can be varied to adjust the angle of the diffracted light output from grating structure 720.

The grating lines 722 lead to periodic perturbations of an input light beam 810 propagating through grating structure 720, which in turn leads to a diffracted light beam 812 that is directed out of grating structure 720 into free space (FIG. 8A). In addition, grating structure 720 can accommodate a diverging input wave that is not collimated, which is injected into an input slab coupled to grating structure 720.

A grating strength of grating structure 720 is a function of the zig-zag amplitude of zig-zag grating lines 722. The zig-zag amplitude is defined as one half of the peak-to-peak displacement of either of the sidewalls of one line of the grating. The amplitude of the individual grating lines 722 can be changed to controllably tune the grating strength. The change in grating strength can be used to produce a uniform diffracted beam that is output from grating structure 720 into free space.

A period of grating lines 722 corresponds to the longitudinal angle from one zig-zag line to the next. The period should be as small as possible (e.g., subwavelength). The period can be varied slightly as a function of the zig-zag amplitude to keep a diffraction angle constant.

Figure 9:
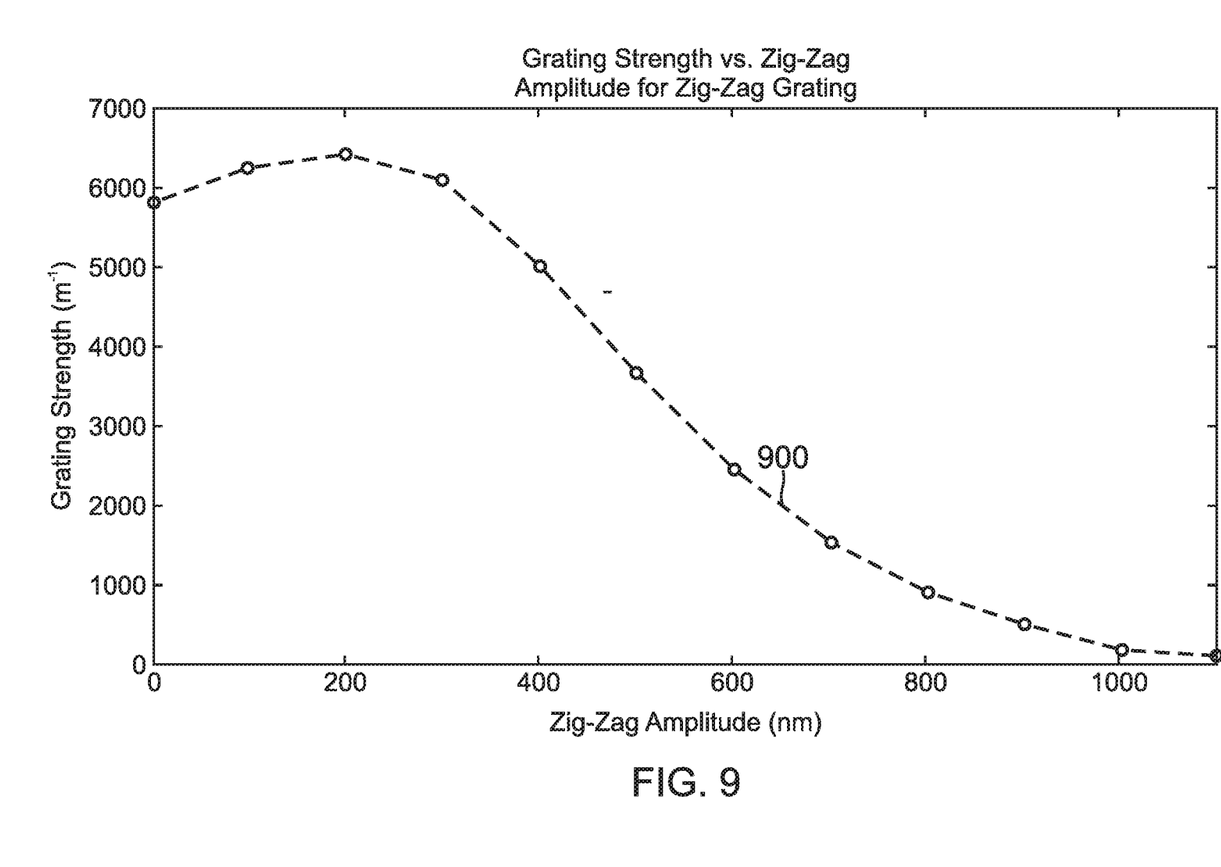
FIG. 9 is a graph of the grating strength with respect to amplitude for zig-zag grating lines of the grating structure of FIG. 8A.

FIG. 9 is a graph of the grating strength with respect to zig-zag amplitude of the zig-zag grating lines. As shown in the graph of FIG. 9, the grating strength can be controlled by changing the zig-zag amplitude. As the zig-zag amplitude is increased, such as from about 200-1000 nm, a corresponding grating strength is decreased and approaches zero, as indicated by plot line 900. This feature can be used to tune the grating strength of the grating coupler.

Figures 10A, 10B, 10C:
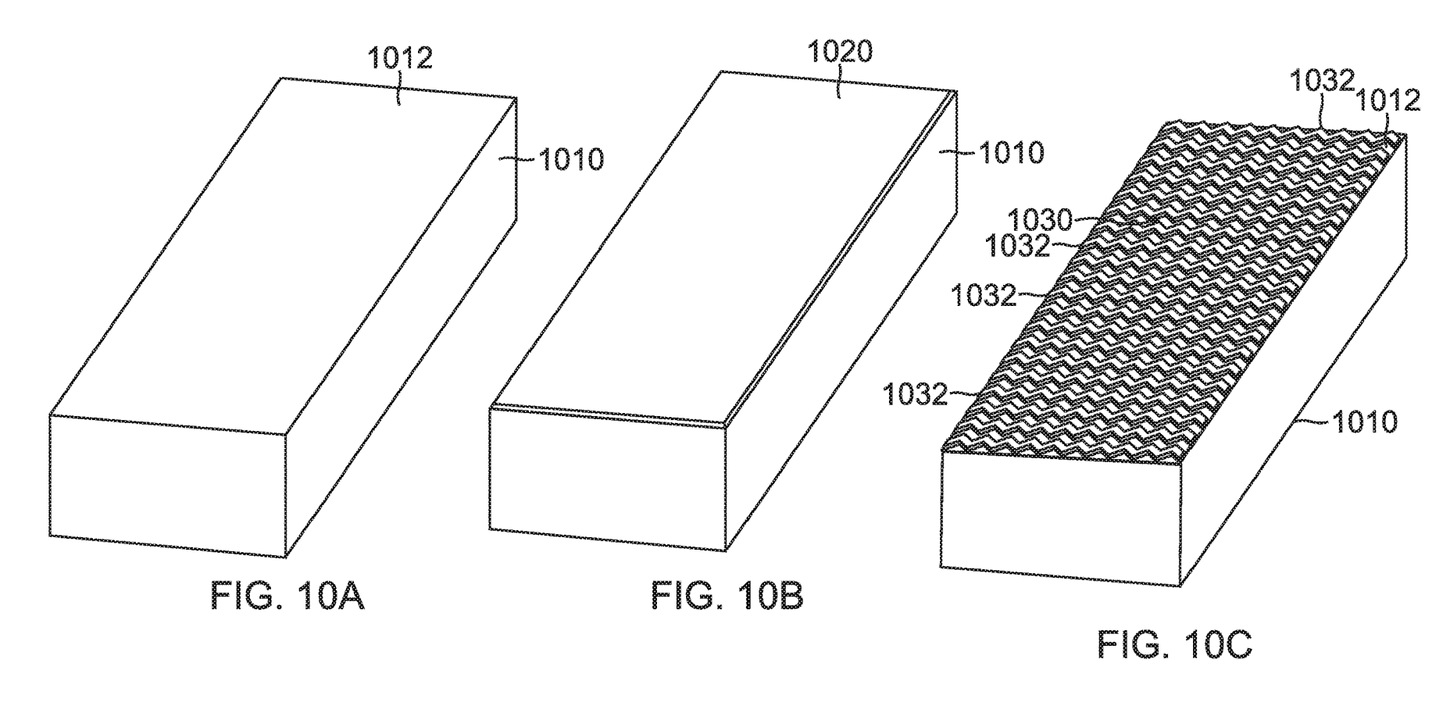
FIGS. 10A-10C illustrate schematic orthogonal views of a method for fabricating the grating coupler of FIG. 7.

FIGS. 10A-10C illustrate schematic orthogonal views of a method for fabricating a zig-zag grating coupler according to an exemplary approach. As shown in FIG. 10A, a substrate layer 1010 such as an initial wafer is provided, and has an upper surface 1012. The substrate layer 1010 includes a first material having a first refractive index, such as silicon dioxide, and can include an underlying handle wafer such as a silicon handle.

As depicted in FIG. 10B, a guiding layer 1020 is deposited on upper surface 1012 of substrate layer 1010 such as by a conventional deposition process. The guiding layer 1020 includes a second material having a second refractive index (such as silicon nitride) that is higher than the first refractive index. Lithography and etching steps are then performed on guiding layer 1020 to form a grating structure 1030 that is defined by an array of zig-zag grating lines 1032, as shown in FIG. 10C.

Optionally, an upper cladding layer can be formed over grating structure 1030, such as by a conventional deposition process, to complete fabrication of the grating coupler. The upper cladding layer can include the first material having the first refractive index, such as silicon dioxide.

Additionally, an optical slab can be formed on upper surface 1012 of substrate 1010, such that the optical slab is in optical communication with grating structure 1020. The optical slab can include the second material having the second refractive index, such as silicon nitride. The optical slab provides an input port that is configured to direct an input light beam into grating structure 1020 during operation.

EXAMPLE EMBODIMENTS

Example 1 includes an optical coupler device, comprising: a substrate having a substantially planar upper surface;

a grating structure on the upper surface of the substrate, the grating structure comprising a copropagating array of waveguides that are substantially parallel to each other and extend along at least a portion of the upper surface, wherein each of the waveguides has opposing sidewalls, wherein a width of each waveguide is defined by a distance between the opposing sidewalls, wherein the opposing sidewalls each having a periodic structure that produces a sidewall modulation for each of the waveguides; and an input port in optical communication with the grating structure, the input port configured to direct an input light beam in plane into the grating structure such that the input light beam propagates along the array of waveguides; wherein the grating structure is configured to diffract the input light beam out of plane and into free space.

Example 2 includes the optical coupler device of Example 1, wherein the substrate comprises a first material having a first refractive index, and the grating structure comprise a second material having a second refractive index that is greater than the first refractive index.

Example 3 includes the optical coupler device of Example 2, wherein the first material comprises silicon dioxide, and the second material comprises silicon nitride.

Example 4 includes the optical coupler device of any of Examples 1-3, wherein each waveguide has a periodic change in the width along a propagation direction based on the periodic structure of the opposing sidewalls, such that each waveguide is individually modulated by the periodic change in the width.

Example 5 includes the optical coupler device of Example 4, wherein the periodic change in the width includes a uniform narrowing and widening of the width of each waveguide along the propagation direction.

Example 6 includes the optical coupler device of any of Examples 1-4, wherein the opposing sidewalls in each waveguide have a serpentine shape along a propagation direction based on the periodic structure of the sidewalls.

Example 7 includes the optical coupler device of any of Examples 1-4, wherein the opposing sidewalls in each waveguide have a semi-serpentine shape along a propagation direction based on the periodic structure of the sidewalls.

Example 8 includes the optical coupler device of any of Examples 1-7, wherein the grating structure has a grating strength that is a function of an amplitude of the sidewall modulation for each of the waveguides.

Example 9 includes the optical coupler device of any of Examples 1-8, wherein the substrate is coupled to an integrated photonics chip.

Example 10 includes an optical coupler device, comprising: a substrate having a substantially planar upper surface; a grating structure on the upper surface of the substrate, the grating structure comprising an array of zig-zag grating lines; and an input port in optical communication with the grating structure, the input port configured to direct an input light beam in plane into the grating structure; wherein each of the zig-zag grating lines is positioned substantially perpendicular to a propagation direction of the input light beam; wherein the grating structure is configured to diffract the input light beam out of plane and into free space.

Example 11 includes the optical coupler device of Example 10, wherein the substrate comprises a first material having a first refractive index, and the grating structure comprise a second material having a second refractive index that is greater than the first refractive index.

Example 12 includes the optical coupler device of Example 11, wherein the first material comprises silicon dioxide, and the second material comprises silicon nitride.

Example 13 includes the optical coupler device of any of Examples 10-12, wherein the grating structure has a grating strength that is a function of an amplitude of each of the zig-zag grating lines.

Example 14 includes the optical coupler device of any of Examples 10-13, wherein the substrate is coupled to an integrated photonics chip.

Example 15 includes a method of fabricating an optical coupler device, the method comprising: providing a substrate layer having an upper surface, the substrate layer including a first material having a first refractive index; depositing a guiding layer on the upper surface of the substrate layer, the guiding layer including a second material having a second refractive index that is higher than the first refractive index; and forming a grating structure in at least a portion of the guiding layer, the grating structure comprising an array of grating lines, wherein each of the grating lines has a periodic structure along a length thereof with a substantially uniform periodic amplitude.

Example 16 includes the method of Example 15, wherein a remaining portion of the guiding layer comprises an input slab in optical communication with the grating structure.

Example 17 includes the method of any of Examples 15-16, further comprising: forming an upper cladding layer over the grating structure, the upper cladding layer comprising the first material having the first refractive index.

Example 18 includes the method of any of Examples 15-17, wherein the array of grating lines comprises a copropagating array of waveguides, wherein each of the waveguides has opposing sidewalls with a periodic structure that produces a sidewall modulation for each of the waveguides.

Example 19 includes the method of any of Examples 15-17, wherein the array of grating lines includes an array of zig-zag grating lines, wherein each of the zig-zag grating lines is positioned substantially perpendicular to a propagation direction of an input light beam injected into the grating structure.

Example 20 includes the method of any of Examples 15-19, wherein the substrate layer is coupled to a silicon photonics chip.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. An optical coupler device, comprising:
   a substrate having a substantially planar upper surface;
   a grating structure on the upper surface of the substrate, the grating structure comprising a copropagating array of waveguides that are substantially parallel to each other and extend along at least a portion of the upper surface;
   wherein the grating structure is defined by an x-y-z coordinate system having an x-axis and z-axis that define an x-z plane, and a y-axis that is substantially perpendicular to the x-z plane, wherein the copropagating array of waveguides extend along the x-z plane;

wherein each of the waveguides has opposing sidewalls, wherein a width of each waveguide is defined by a distance between the opposing sidewalls, wherein the opposing sidewalls each having a periodic structure that produces a sidewall modulation for each of the waveguides; and wherein the opposing sidewalls in each waveguide have a shape comprising:
  a serpentine shape along a propagation direction based on the periodic structure of the sidewalls, wherein the width of each waveguide between the opposing sidewalls remains substantially constant along each waveguide; or
  a semi-serpentine shape along a propagation direction based on the periodic structure of the sidewalls, wherein the opposing sidewalls of each waveguide are out of phase with respect to each other along each waveguide; and an input port in optical communication with the grating structure, the input port configured to direct an input light beam into the grating structure substantially along the z-axis such that the input light beam propagates in the array of waveguides;

wherein the grating structure is configured to diffract the input light beam out of the grating structure substantially along the y-axis and into free space.

2. The optical coupler device of claim 1, wherein the substrate comprises a first material having a first refractive index, and the grating structure comprise a second material having a second refractive index that is greater than the first refractive index.

3. The optical coupler device of claim 2, wherein the first material comprises silicon dioxide, and the second material comprises silicon nitride.

4. The optical coupler device of claim 1, wherein the grating structure has a grating strength that is a function of an amplitude of the sidewall modulation for each of the waveguides.

5. The optical coupler device of claim 1, wherein the substrate is coupled to an integrated photonics chip.

6. The optical coupler device of claim 1, wherein when the opposing sidewalls in each waveguide have a serpentine shape, the opposing sidewalls of each waveguide have modulations that are about 180 degrees out of phase with respect to each other.

7. The optical coupler device of claim 1, wherein when the opposing sidewalls in each waveguide have a semi-serpentine shape, the opposing sidewalls of each waveguide have modulations that are about 90 degrees out of phase with respect to each other.

8. An optical coupler device, comprising:
a substrate having a substantially planar upper surface;
a grating structure on the upper surface of the substrate, the grating structure comprising an array of zig-zag grating lines, wherein each of the zig-zag grating lines has opposing sidewalls, wherein the grating structure is defined by an x-y-z coordinate system having an x-axis and z-axis that define an x-z plane, and a y-axis that is substantially perpendicular to the x-z plane, wherein the array of zig-zag grating lines are along the x-z plane; and
an input port in optical communication with the grating structure, the input port configured to direct an input light beam into the grating structure substantially along the z-axis;

wherein each of the zig-zag grating lines is positioned substantially perpendicular to a propagation direction of the input light beam;
wherein the opposing sidewalls of each zig-zag grating line are in phase with respect to each other;
wherein the grating structure is configured to diffract the input light beam out of the grating structure substantially along the y-axis and into free space.

9. The optical coupler device of claim 8, wherein the substrate comprises a first material having a first refractive index, and the grating structure comprise a second material having a second refractive index that is greater than the first refractive index.

10. The optical coupler device of claim 9, wherein the first material comprises silicon dioxide, and the second material comprises silicon nitride.

11. The optical coupler device of claim 8, wherein the grating structure has a grating strength that is a function of an amplitude of each of the zig-zag grating lines.

12. A method of fabricating an optical coupler device, the method comprising:
providing a substrate layer having an upper surface, the substrate layer including a first material having a first refractive index;
depositing a guiding layer on the upper surface of the substrate layer, the guiding layer including a second material having a second refractive index that is higher than the first refractive index; and
forming a grating structure in at least a portion of the guiding layer, the grating structure comprising an array of grating lines, wherein each of the grating lines has a periodic structure along a length thereof with a substantially uniform periodic amplitude, wherein the grating structure is defined by an x-y-z coordinate system having an x-axis and z-axis that define an x-z plane, and a y-axis that is substantially perpendicular to the x-z plane, wherein the array of grating lines extend along the x-z plane;
wherein the array of grating lines comprises a copropagating array of waveguides, wherein each of the waveguides has opposing sidewalls with a periodic structure that produces a sidewall modulation for each of the waveguides, wherein the opposing sidewalls in each waveguide have a shape comprising:
  a serpentine shape along a propagation direction based on the periodic structure of the sidewalls, wherein the width of each waveguide between the opposing sidewalls remains substantially constant along each waveguide; or
  a semi-serpentine shape along a propagation direction based on the periodic structure of the sidewalls, wherein the opposing sidewalls of each waveguide are out of phase with respect to each other along each waveguide;
wherein the grating structure is configured to diffract an input light beam, propagating substantially along the z-axis, out of the grating structure substantially along the y-axis and into free space.

13. The method of claim 12, wherein a remaining portion of the guiding layer comprises an input slab in optical communication with the grating structure.

14. The method of claim 12, further comprising:
forming an upper cladding layer over the grating structure, the upper cladding layer comprising the first material having the first refractive index.

* * * * *